(12) United States Patent
Suzuki et al.

(10) Patent No.: US 12,409,418 B2
(45) Date of Patent: Sep. 9, 2025

(54) HOLLOW FIBER DEGASSING MODULE, INKJET PRINTER, AND METHOD FOR DEGASSING LIQUID

(71) Applicant: DIC Corporation, Tokyo (JP)

(72) Inventors: Naruhito Suzuki, Ichihara (JP); Youhei Suganuma, Ichihara (JP); Kazumi Oi, Ichihara (JP)

(73) Assignee: DIC Corporation, Tokyo (JP)

( * ) Notice: Subject to any disclaimer, the term of this patent is extended or adjusted under 35 U.S.C. 154(b) by 313 days.

(21) Appl. No.: 17/597,097

(22) PCT Filed: Jun. 23, 2020

(86) PCT No.: PCT/JP2020/024651
§ 371 (c)(1),
(2) Date: Dec. 27, 2021

(87) PCT Pub. No.: WO2020/262398
PCT Pub. Date: Dec. 30, 2020

(65) Prior Publication Data
US 2022/0250393 A1 Aug. 11, 2022

(30) Foreign Application Priority Data
Jun. 28, 2019 (JP) .................. 2019-121277

(51) Int. Cl.
| | | |
|---|---|---|
| *B41J 2/19* | (2006.01) | |
| *B01D 19/00* | (2006.01) | |
| *B01D 63/02* | (2006.01) | |
| *B01D 63/04* | (2006.01) | |

(52) U.S. Cl.
CPC ......... *B01D 63/02* (2013.01); *B01D 19/0031* (2013.01); *B01D 63/04* (2013.01)

(58) Field of Classification Search
CPC .... B01D 63/02; B01D 19/0031; B01D 43/04; B01D 69/08; B01D 2313/23; B01D 2201/0407; B01D 2201/0415
(Continued)

(56) References Cited

U.S. PATENT DOCUMENTS 6,648,945 B1 * 11/2003 Takeda ................. B01D 69/02
96/10
2003/0192820 A1 * 10/2003 Cho ...................... B01D 63/026
210/321.74
(Continued)

FOREIGN PATENT DOCUMENTS

| EP | 1174175 A1 | 1/2002 |
| EP | 3238943 A1 | 11/2017 |

(Continued)

OTHER PUBLICATIONS

Jun. 20, 2023, the Extended European Search Report issued by the European Patent Office in the corresponding European Patent Application No. 20832656.1.
(Continued)

*Primary Examiner* — Qianping He
(74) *Attorney, Agent, or Firm* — KENJA IP LAW PC

(57) ABSTRACT

A hollow fiber degassing module includes: a hollow fiber membrane bundle including a plurality of hollow fiber membranes bundled into a cylindrical shape; a housing that houses the hollow fiber membrane bundle, includes a liquid supply port and a liquid discharge port that are formed in communication with spaces between the plurality of hollow fiber membrane, and further includes a suction port formed in communication with inner spaces of the plurality of hollow fiber membranes; and an outer support having a plurality of openings formed therein and disposed between the hollow fiber membrane bundle and the housing.

15 Claims, 15 Drawing Sheets

(58) Field of Classification Search
USPC .......................................................... 96/46
See application file for complete search history.

(56) References Cited

U.S. PATENT DOCUMENTS

| | | | |
|---|---|---|---|
| 2009/0167829 A1 | 7/2009 | Iijima | |
| 2017/0348640 A1* | 12/2017 | Suganuma | ............. B01D 63/02 |
| 2018/0056665 A1* | 3/2018 | Suganuma | ........... B01D 71/261 |
| 2019/0388841 A1 | 12/2019 | Morita | |

FOREIGN PATENT DOCUMENTS

| | | | | |
|---|---|---|---|---|
| JP | 06226061 A | * | 8/1994 | |
| JP | H06226057 A | | 8/1994 | |
| JP | H06226061 A | | 8/1994 | |
| JP | H0768103 A | | 3/1995 | |
| JP | 2000229225 A | | 8/2000 | |
| JP | 2000325762 A | | 11/2000 | |
| JP | 2016120489 A | | 7/2016 | |
| TW | 200846070 A | | 12/2008 | |
| WO | 2007063720 A1 | | 6/2007 | |
| WO | 2008088293 A1 | | 7/2008 | |
| WO | WO-2013040727 A1 | * | 3/2013 | ........... B01D 63/043 |
| WO | 2018146788 A1 | | 8/2018 | |

OTHER PUBLICATIONS

Aug. 11, 2020, International Search Report issued in the International Patent Application No. PCT/JP2020/024651.

* cited by examiner

HOLLOW FIBER DEGASSING MODULE, INKJET PRINTER, AND METHOD FOR DEGASSING LIQUID

TECHNICAL FIELD

The present invention relates to a hollow fiber degassing module for degassing a liquid, an inkjet printer equipped with the hollow fiber degassing module, and a method for degassing a liquid.

BACKGROUND ART

PTL 1 discloses continuous degassing of an ink using a hollow fiber degassing module that uses hollow fiber membranes and is attached to an ink channel of an inkjet printer. The hollow fiber degassing module described in PTL 1 is an external perfusion-type hollow fiber degassing module in which a hollow fiber membrane bundle including a plurality of bundled hollow fiber membranes is housed in a cylinder. An ink is supplied to the outer side of the hollow fiber membranes, and the pressure inside the spaces inside the hollow fiber membranes are reduced to degas the ink. Then the degassed ink is discharged from a discharge port formed in the side wall of the cylinder.

CITATION LIST

Patent Literature

PTL 1: International Publication No. WO 2007/063720
PTL 2: Japanese Unexamined Patent Application Publication No. 2016-120489

SUMMARY OF INVENTION

Technical Problem

As disclosed in PTL 2, the inventors have found that pressure drop in a hollow fiber degassing module increases abruptly when swollen hollow fiber membranes enter a hollow portion of the hollow fiber membrane bundle. On the basis of this finding, the inventors have invented a hollow fiber degassing module including a support that abuts against the inner circumferential surface of the hollow fiber membrane bundle.

Then the inventors have conducted further studies and found that the pressure drop in the hollow fiber degassing module may increase abruptly not only when swollen hollow fiber membranes enter the hollow portion of the hollow fiber membrane bundle but also when the swollen hollow fiber membranes come into pressure contact with the inner circumferential surface of the housing containing the hollow fiber membrane bundle. For example, when the swollen hollow fiber membranes are in pressure contact with the inner circumferential surface of the housing, the liquid discharge port of the housing is clogged with the hollow fiber membranes, and this may cause an abrupt increase in the pressure drop in the hollow fiber degassing module. Moreover, when the swollen hollow fiber membranes are in pressure contact with the inner circumferential surface of the housing, the gap between the hollow fiber membrane bundle and the housing is closed, and this may cause an abrupt increase in the pressure drop in the hollow fiber degassing module.

Accordingly, one aspect of the present invention is to provide a hollow fiber degassing module in which an abrupt increase in pressure drop can be prevented and to provide an inkjet printer and a method for degassing a liquid.

Solution to Problem

A hollow fiber degassing module according to one aspect of the present invention includes: a hollow fiber membrane bundle including a plurality of hollow fiber membranes bundled into a cylindrical shape; a housing that houses the hollow fiber membrane bundle, includes a liquid supply port and a liquid discharge port that are formed in communication with spaces between the plurality of hollow fiber membranes, and further includes a suction port formed in communication with inner spaces of the plurality of hollow fiber membranes; and an outer support having a plurality of openings formed therein and disposed between the hollow fiber membrane bundle and the housing.

In this hollow fiber degassing module, since the outer support is disposed between the hollow fiber membrane bundle and the housing, the swollen hollow fiber membranes are supported by the outer support from the radially outer side of the hollow fiber membrane bundle. Therefore, even when the plurality of hollow fiber membranes swell with a liquid, the plurality of hollow fiber membranes can be prevented from coming into pressure contact with the inner circumferential surface of the housing. This configuration can prevent an abrupt increase in pressure drop in the hollow fiber degassing module due to, for example, clogging of the liquid discharge port of the housing with the hollow fiber membranes. Moreover, an abrupt increase in the pressure drop in the hollow fiber degassing module due to closing of the gap between the hollow fiber membrane bundle and the housing can be prevented. Therefore, degassing of the liquid can be performed for a long time.

The outer support may have a cylindrical shape. When the outer support is cylindrical, the swollen hollow fiber membranes can be appropriately supported from the radially outer side of the hollow fiber membrane bundle.

The outer support may have a mesh form. When the outer support has a mesh form, an increase in the pressure drop of the liquid passing through the outer support can be prevented while the swollen hollow fiber membranes are supported from the radially outer side of the hollow fiber membrane bundle. In this manner, an increase in the initial pressure in the hollow fiber degassing module can be prevented.

The hollow fiber degassing module may further include: a first sealing portion that fixes one membrane bundle end portion of the hollow fiber membrane bundle and one support end portion of the outer support to the housing; and a second sealing portion that fixes the other membrane bundle end portion of the hollow fiber membrane bundle and the other support end portion of the outer support to the housing. In a cross section passing through one membrane bundle end portion and orthogonal to an axial direction of the housing, the first sealing portion may fill an entire region in the housing except for a hollow portion of the hollow fiber membrane bundle. In a cross section passing through the other membrane bundle end portion and orthogonal to the axial direction of the housing, the second sealing portion may fill an entire region in the housing except for the inner spaces of the plurality of hollow fiber membranes. When the first sealing portion and the second sealing portion fill the respective spaces as described above, the plurality of hollow fiber membranes divide the inner region of the housing into a first region including the spaces between the plurality of hollow fiber membranes and a second region including the inner spaces of the plurality of hollow fiber membranes. In this case, the liquid supplied from the liquid supply port can be supplied from the hollow portion of the hollow fiber membrane bundle to the spaces between the plurality of hollow fiber membranes and then discharged from the liquid discharge port. Moreover, the inner spaces of the plurality of hollow fiber membranes can be evacuated through the suction port, and the liquid supplied from the liquid supply port can be prevented from being discharged to the suction port.

The outer support may be disposed between an end surface of the first sealing portion that is on a side opposite to the second sealing portion and an end surface of the second sealing portion that is on a side opposite to the first sealing portion. When the outer support is disposed between the end surface of the first sealing portion that is on the side opposite to the second sealing portion and the end surface of the second sealing portion that is on the side opposite to the first sealing portion as described above, the hollow fiber degassing module can be produced easily, so that the cost of production of the hollow fiber degassing module can be reduced.

An end portion of the outer support that is on a second sealing portion side may be embedded in the second sealing portion. When the end portion of the outer support that is on the second sealing portion side is embedded in the second sealing portion as described above, the interface between the outer support and the second sealing portion is not exposed at the end surface of the second sealing portion that is on the side opposite to the first sealing portion. In this case, even when the liquid enters the interface between the outer support and the second sealing portion, leakage of the liquid from the second sealing portion can be prevented. Moreover, when a suction pump is connected to the suction port, damage to the suction pump due to the liquid discharged from the suction port can be prevented.

An end portion of the outer support that is on a first sealing portion side may be exposed from the first sealing portion. When the end portion of the outer support that is on the first sealing portion side is exposed from the first sealing portion as described above, the hollow fiber degassing module can be produced easily, so that the cost of production of the hollow fiber degassing module can be reduced.

The outer support may be spaced apart from the hollow fiber membrane bundle when the plurality of hollow fiber membranes are not swollen. When the outer support is spaced apart from the hollow fiber membrane bundle when the plurality of hollow fiber membranes are not swollen as described above, the plurality of hollow fiber membranes are allowed to swell, and the swollen hollow fiber membranes can be prevented from coming into pressure contact with the inner circumferential surface of the housing. In this manner, breakage of the swollen hollow fiber membranes can be prevented.

The plurality of openings of the outer support may include a first opening and a second opening adjacent to the first opening, and the outer support may have an outer communication portion that is formed between the outer support and a circumscribed circumferential surface of the outer support and allows communication between the first opening and the second opening. When the outer communication portion is formed in the outer support as described above, even if the outer support is expanded due to, for example, swelling of the plurality of hollow fiber membranes and brought into pressure contact with the inner circumferential surface of the housing, a flow channel through which the liquid flows can remain between the outer support and the inner circumferential surface of the housing. This can prevent an abrupt increase in the pressure drop in the hollow fiber degassing module.

The plurality of openings of the outer support may include a first opening and a second opening adjacent to the first opening, and the outer support may have an inner communication portion that is formed between the outer support and an inscribed circumferential surface of the outer support and allows communication between the first opening and the second opening. When the inner communication portion is formed in the outer support as described above, even if the outer support is expanded due to, for example, swelling of the plurality of hollow fiber membranes and brought into pressure contact with the inner circumferential surface of the housing, a flow channel through which the liquid flows can remain between the outer support and the plurality of hollow fiber membranes. This can prevent an abrupt increase in the pressure drop in the hollow fiber degassing module.

The liquid may contain a hydrocarbon solvent. When the liquid contains the hydrocarbon solvent as described above, the plurality of hollow fiber membranes easily swell. However, since the outer support is provided, an abrupt increase in the pressure drop in the hollow fiber degassing module can be prevented.

The liquid may be at least one selected from the group consisting of glycols, glycol monoalkyl ethers, glycol dialkyl ethers, glycol monoacetates, glycol diacetates, alcohols, ketones, acetates, lactates, saturated hydrocarbons, unsaturated hydrocarbons, cyclic saturated hydrocarbons, cyclic unsaturated hydrocarbons, aromatic hydrocarbons, terpenes, ethers, cyclic imides, 3-alkyl-2-oxazolidinones, N-alkyl pyrrolidones, lactone, and nitrogen-containing solvents. When the liquid is any of those described above, the plurality of hollow fiber membranes easily swell. However, since the outer support is provided, an abrupt increase in the pressure drop in the hollow fiber degassing module can be prevented.

The liquid may be an UV ink or a ceramic ink. When the liquid is an UV ink or a ceramic ink as described above, the plurality of hollow fiber membranes easily swell. However, since the outer support is provided, an abrupt increase in the pressure drop in the hollow fiber degassing module can be prevented.

An inkjet printer according to another aspect of the present invention is an inkjet printer in which an ink stored in an ink storage unit is supplied to an inkjet head through an ink channel. The inkjet printer includes any of the above-described hollow fiber degassing modules, and the hollow fiber degassing module is attached to the ink channel. In this inkjet printer, since any of the above-described hollow fiber degassing modules is attached to the ink channel, an abrupt increase in the pressure drop in the ink channel due to swelling of the hollow fiber membranes with the ink can be prevented. Therefore, degassing of the ink can be performed for a long time.

A method for degassing a liquid according to another aspect of the present invention uses any of the above-described hollow fiber degassing modules. The method includes: supplying a liquid to the liquid supply port to thereby supply the liquid to the spaces between the plurality of hollow fiber membranes; sucking air through the suction port to degas the liquid supplied to the spaces between the plurality of hollow fiber membranes; and discharging the liquid degassed in the spaces between the plurality of hollow fiber membranes from the liquid discharge port. In this liquid degassing method, the liquid is degassed using any of the above-described hollow fiber degassing modules. Therefore, an abrupt increased in the pressure drop in the hollow fiber degassing module due to swelling of the hollow fiber membranes with the liquid can be prevented, so that degassing of the liquid can be performed for a long time.

Advantageous Effects of Invention

According to the present invention, an abrupt increase in the pressure drop can be prevented.

DESCRIPTION OF EMBODIMENTS

Figure 1:
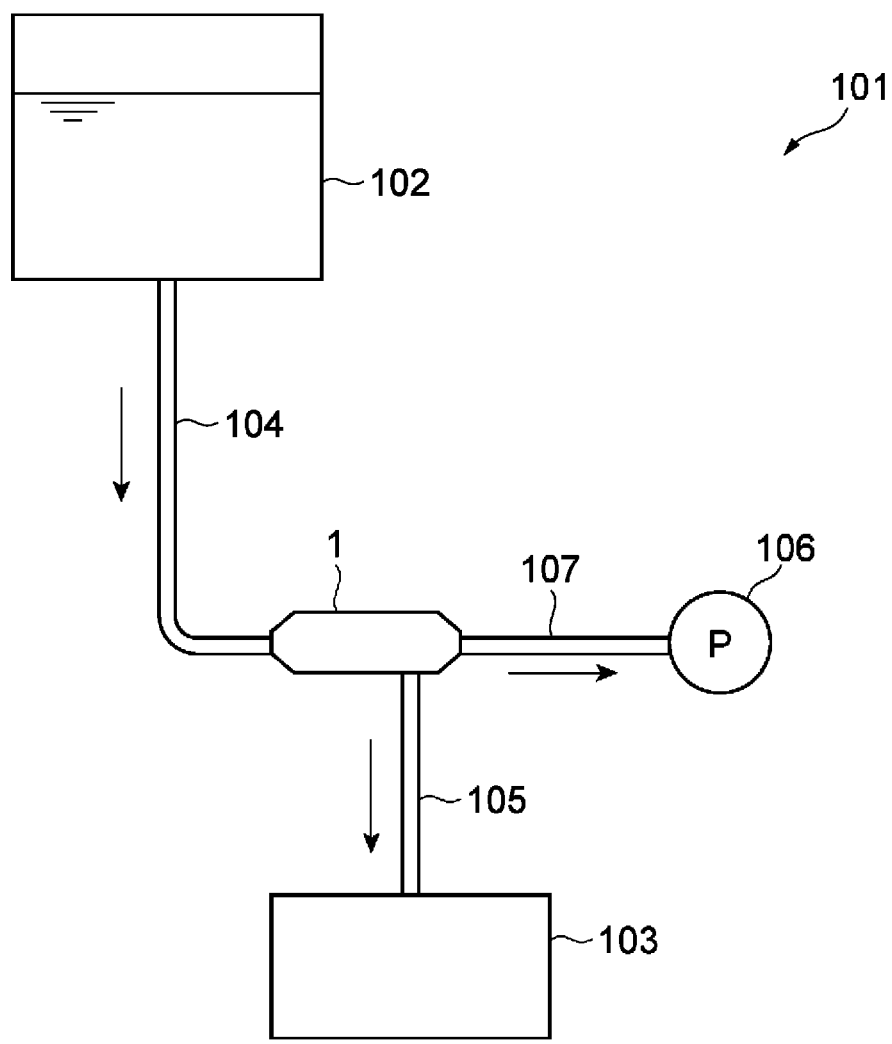
FIG. 1 A schematic illustration of an inkjet printer according to an embodiment.

A hollow fiber degassing module, an inkjet printer, and a method for degassing a liquid in an embodiment will be described in detail with reference to the drawings. In the hollow fiber degassing module in the embodiment, the hollow fiber degassing module of the present invention is applied to a hollow fiber degassing module for degassing an ink. In the drawings, the same or corresponding parts are denoted by the same symbols, and redundant description will be omitted.

FIG. 1 is a schematic diagram of the inkjet printer according to the embodiment. As shown in FIG. 1, the inkjet printer 101 according to the embodiment includes mainly: an ink storage unit 102 such as an ink tank for storing an ink; an inkjet head 103 that sprays fine droplets of the ink directly to a printing medium; a first ink supply pipe 104 to which the ink is supplied from the ink storage unit 102; a second ink supply pipe 105 for supplying the ink to the inkjet head 103; the hollow fiber degassing module 1 according to the embodiment that is attached to the first ink supply pipe 104 and the second ink supply pipe 105 to degas the ink; a suction pump 106 for evacuation; and a suction pipe 107 that connects the suction pump 106 to the hollow fiber degassing module 1. The first ink supply pipe 104 and the second ink supply pipe 105 are ink channels extending from the ink storage unit 102 to the inkjet head 103. No particular limitation is imposed on the ink used for the inkjet printer 101. Examples of the ink include water-based inks, UV inks, solvent inks, and ceramic inks.

Figure 2:
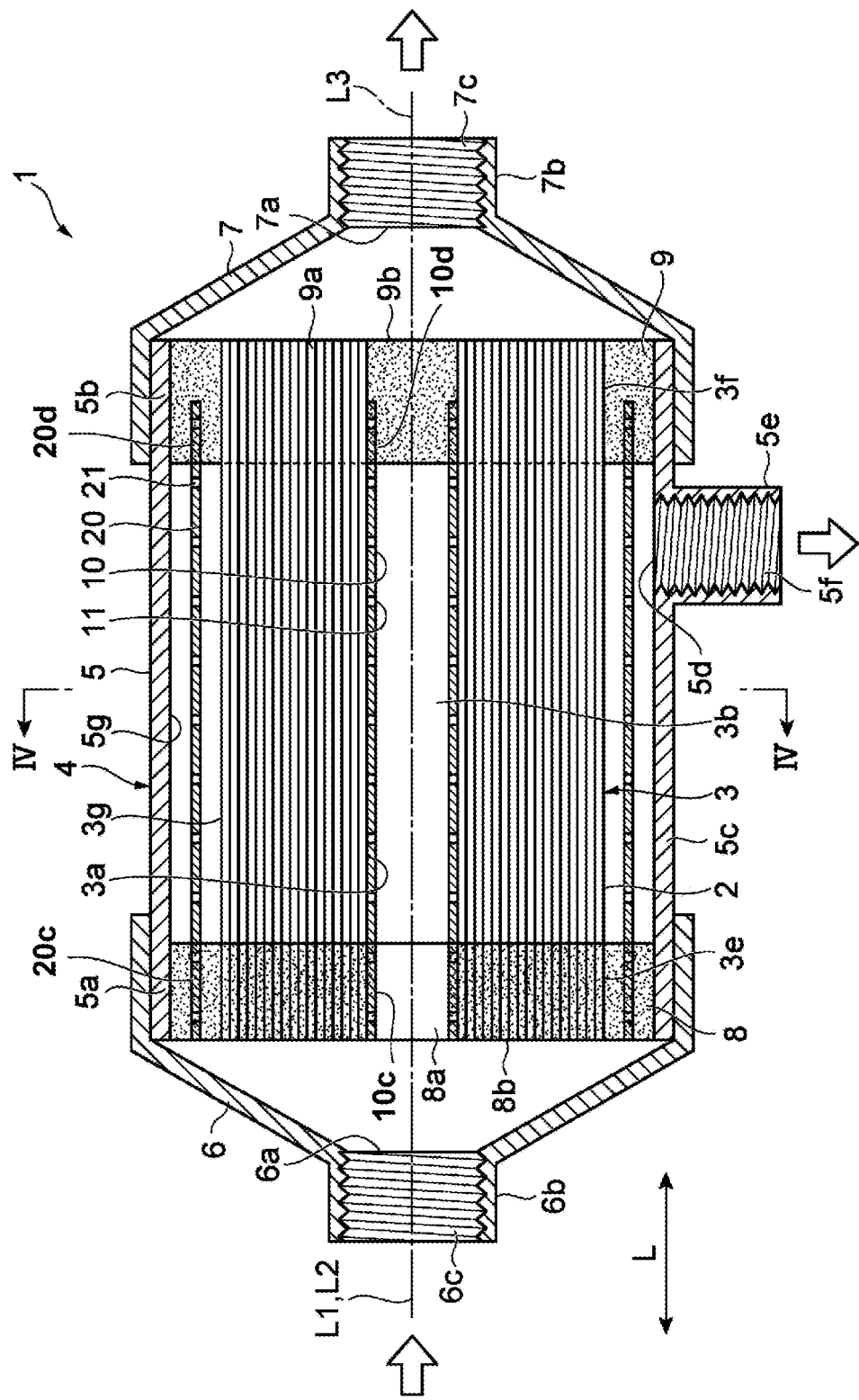
FIG. 2 A schematic cross-sectional view of a hollow fiber degassing module according to the embodiment.
Figure 3A:
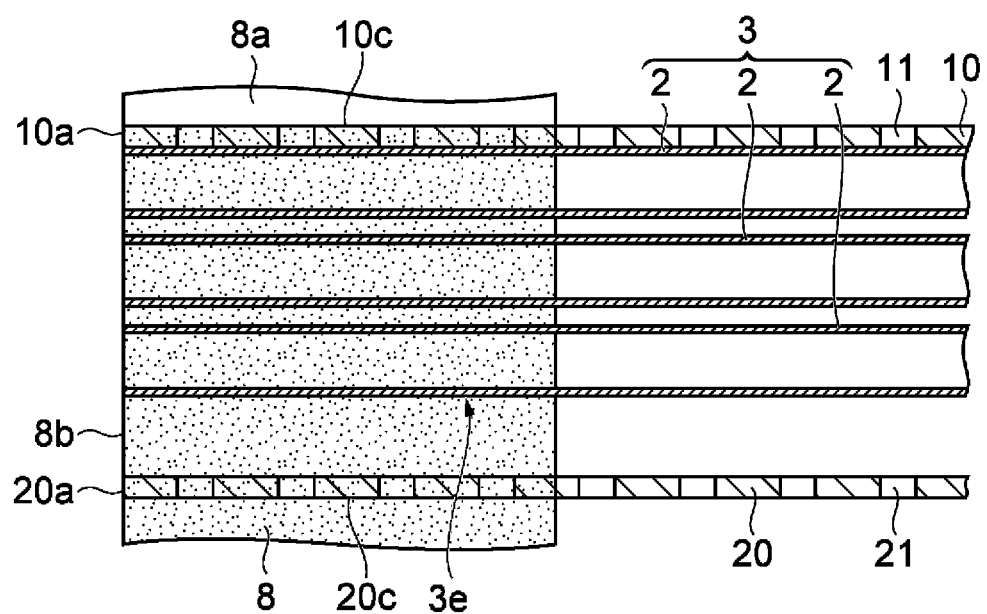
FIG. 3A partial schematic illustration of a hollow fiber membrane bundle shown in FIG. 2.
Figure 3B:
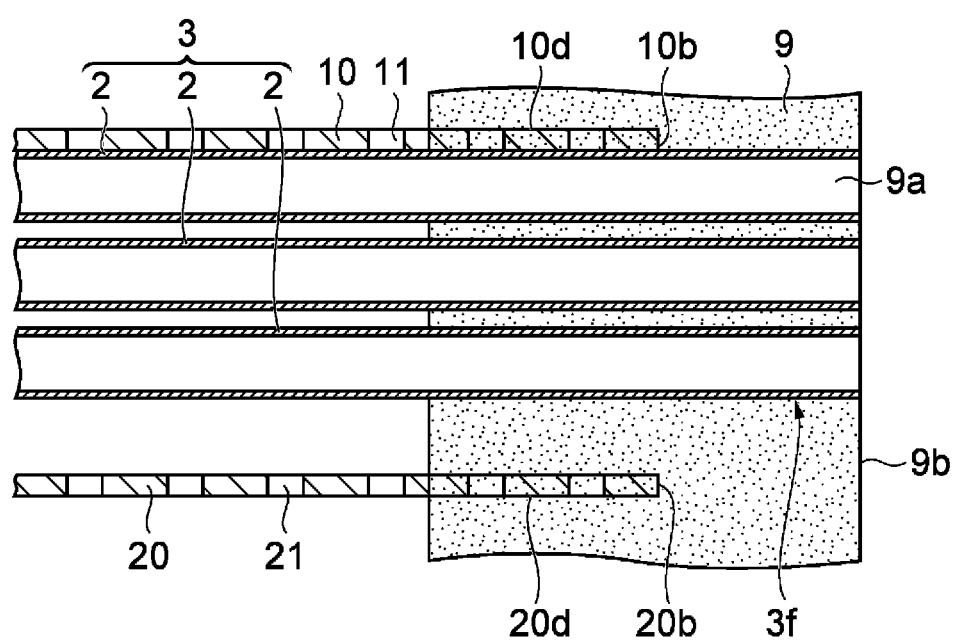
FIG. 3B partial schematic illustration of a hollow fiber membrane bundle shown in FIG. 2.
Figure 4:
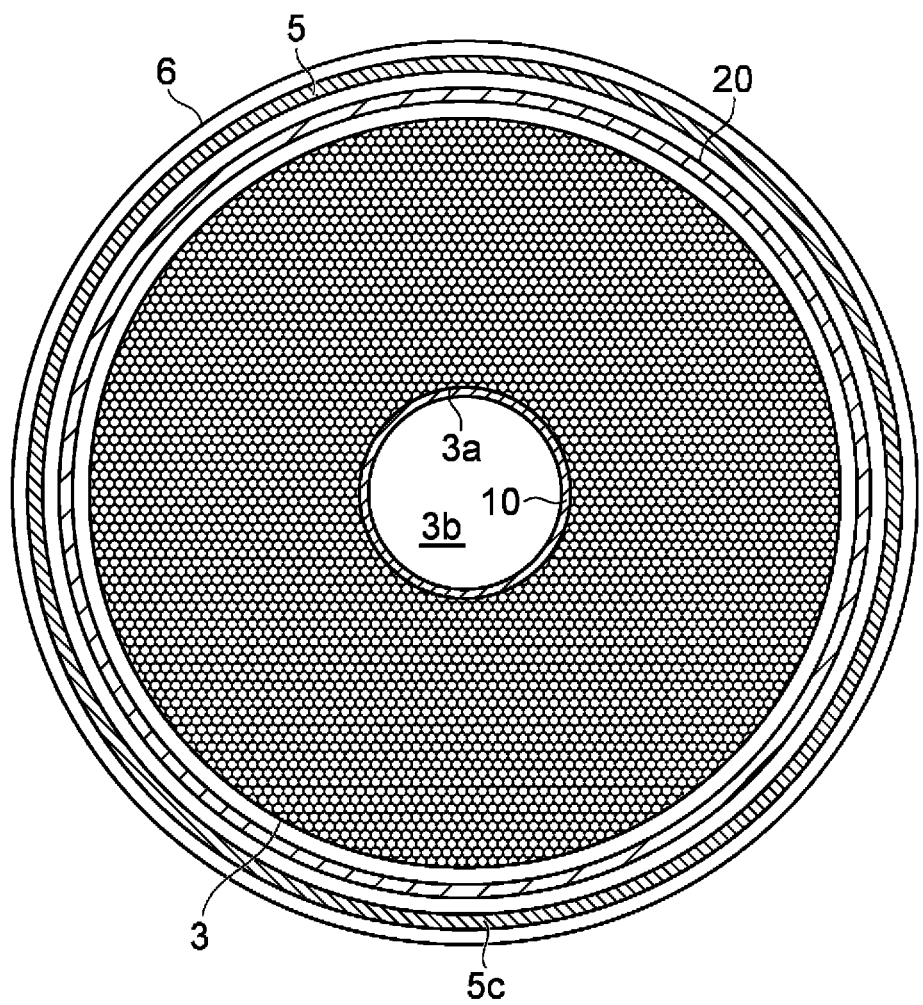
FIG. 4 A cross-sectional view along line IV-IV shown in FIG. 2.

FIG. 2 is a schematic cross-sectional view of the hollow fiber degassing module according to the embodiment. FIGS. 3A and 3B are partial enlarged views of the hollow fiber membrane bundle shown in FIG. 2. FIG. 4 is a cross-sectional view along line IV-IV shown in FIG. 2. As shown in FIGS. 1 to 4, the hollow fiber degassing module 1 includes: a hollow fiber membrane bundle 3 including a plurality of hollow fiber membranes 2 bundled into a cylindrical shape; a cylindrical housing 4 that houses the hollow fiber membrane bundle 3; an inner support 10 in contact with the inner circumferential surface 3a of the hollow fiber membrane bundle 3; and an outer support 20 disposed between the hollow fiber membrane bundle 3 and the housing 4. In the hollow fiber degassing module 1, the plurality of hollow fiber membranes 2 divide the housing 4 into a first region including spaces between the plurality of hollow fiber membranes 2 and a second region including the inner spaces of the plurality of hollow fiber membranes 2. The first region is a region to which the ink is to be supplied, and the second region is a region to be evacuated. In the hollow fiber degassing module 1, the ink is supplied from a hollow portion 3b of the hollow fiber membrane bundle 3 to the spaces between the plurality of hollow fiber membranes 2 (the first region), and the inner regions of the plurality of hollow fiber membranes 2 (the second region) are evacuated to degas the ink. The hollow portion 3b is a hollow portion located in a radially central portion of the hollow fiber membrane bundle 3.

The hollow fiber membranes 2 are membranes of hollow fibers that are permeable to gases but do not allow liquids to pass therethrough. The hollow fiber membranes 2 have the property of swelling with a liquid such as an ink. No particular limitation is imposed on the material of the hollow fiber membranes 2, their membrane shape, their membrane form, etc. Examples of the material of the hollow fiber membranes 2 include: polyolefin-based resins such as polypropylene, polyethylene, and polymethylpentene; silicon-based resins such as polydimethylsiloxane and its copolymers; and fluororesins such as PTFE and vinylidene fluoride. Examples of the membrane shape (the shape of the side walls) of the hollow fiber membranes 2 include porous membranes, microporous membranes, and homogeneous membranes with no pores (non-porous membranes). Examples of the membrane form of the hollow fiber membranes 2 include: symmetric membranes (homogeneous membranes) whose overall chemical or physical structure is homogeneous; and asymmetric membranes (heterogeneous membranes) whose chemical or physical structure varies from place to place. The asymmetric membrane (heterogeneous membrane) is a membrane including a nonporous dense layer and a porous portion. In this case, the dense layer may be formed in any portion in the membrane such as a surface layer portion of the porous membrane, its inner portion, etc. The term heterogeneous membrane encompasses composite membranes including different chemical structures and multilayer membranes such as three-layer structure membranes. In particular, a heterogeneous membrane using a poly 4-methylpentene-1 resin has a dense layer that blocks liquids and is therefore particularly preferable for degassing liquids other than water such as inks. For hollow fibers used for external perfusion-type modules, it is preferable that a dense layer is formed on the outermost surface of the hollow fibers.

The hollow fiber membrane bundle 3 can be formed, for example, from a hollow fiber membrane sheet (not shown) including a plurality of hollow fiber membranes 2 woven into a bamboo blind form. In this case, for example, the hollow fiber membrane sheet used to form the hollow fiber membrane bundle 3 may include 10 to 40 hollow fiber membranes 2 per inch. The hollow portion 3b serving as an ink channel is formed on the radially inner side of the hollow fiber membrane bundle 3. The hollow portion 3b is defined by the inner circumferential surface 3a of the hollow fiber membrane bundle 3.

The housing 4 includes a casing 5, a first lid portion 6, and a second lid portion 7.

The casing 5 is a member that houses the hollow fiber membrane bundle 3. The casing 5 is formed into a cylindrical shape extending in an axial direction L, and both end portions of the casing 5 are open. The first lid portion 6 is attached to one opening end portion 5a that is one opening end portion of the casing 5, and the second lid portion 7 is attached to the other opening end portion 5b that is the other opening end portion of the casing 5. The first lid portion 6 and the second lid portion 7 are attached to the casing 5 by, for example, screwing, fitting, adhering, etc.

The first lid portion 6 is formed into a tapered shape whose diameter decreases as the distance from the casing 5 increases. A liquid supply port 6a is formed at an end portion of the first lid portion 6. An inner space in communication with the liquid supply port 6a is formed inside the first lid portion 6. The liquid supply port 6a is an opening formed in the first lid portion 6 to supply the ink to the spaces between the plurality of hollow fiber membranes 2. The liquid supply port 6a is, for example, circular. The liquid supply port 6a is formed on a center axis L1 of the casing 5. A connection portion 6b to which the first ink supply pipe 104 is to be detachably connected extends in the axial direction L from the liquid supply port 6a. The connection portion 6b is formed into a cylindrical shape, and a female thread 6c into which the first ink supply pipe 104 is to be screwed is formed on the inner circumferential surface of the connection portion 6b. The connection between the connection portion 6b and the first ink supply pipe 104 is not limited to screwing, and they may be connected by, for example, fitting.

The second lid portion 7 is formed into a tapered shape whose diameter decreases as the distance from the casing 5 increases. A suction port 7a is formed at an end portion of the second lid portion 7. An inner space in communication with the suction port 7a is formed inside the second lid portion 7. The suction port 7a is an opening formed in the second lid portion 7 to evacuate the inner spaces of the plurality of hollow fiber membranes 2. The suction port 7a is, for example, circular. The suction port 7a is formed on the center axis L1 of the casing 5. A connection portion 7b to which the suction pipe 107 is to be detachably connected extends in the axial direction L from the suction port 7a. The connection portion 7b is formed into a cylindrical shape, and a female thread 7c into which the suction pipe 107 is to be screwed is formed on the inner circumferential surface of the connection portion 7b. The connection between the connection portion 7b and the suction pipe 107 is not limited to screwing, and they may be connected by, for example, fitting.

A liquid discharge port 5d is formed in a side wall 5c of the casing 5. The liquid discharge port 5d is an opening formed in the casing 5 to discharge the ink from the spaces between the plurality of hollow fiber membranes 2. The liquid discharge port 5d is, for example, circular. The liquid discharge port 5d is formed in a position displaced from the center of the casing 5 in the axial direction L toward the other opening end portion 5b. A connection portion 5e to which the second ink supply pipe 105 is to be detachably connected extends from the liquid discharge port 5d in a direction orthogonal to the axial direction L. The connection portion 5e is formed into a cylindrical shape, and a female thread 5f into which the second ink supply pipe 105 is to be screwed is formed on the inner circumferential surface of the connection portion 5e. The connection between the liquid discharge port 5d and the second ink supply pipe 105 is not limited to screwing, and they may be connected by, for example, fitting.

From the viewpoint of ease of production, it is preferable that the casing 5, the first lid portion 6, and the second lid portion 7 are made of a resin. In this case, the casing 5, the first lid portion 6, and the second lid portion 7 can be produced by injection molding. Preferably, the casing 5, the first lid portion 6, and the second lid portion 7 are of a color that does not allow UV light to pass therethrough, e.g., a black color, in consideration of the case where the ink used is an UV ink.

One membrane bundle end portion 3e of the hollow fiber membrane bundle 3 is fixed to one opening end portion 5a of the casing 5 through a first sealing portion 8, and the other membrane bundle end portion 3f of the hollow fiber membrane bundle 3 is fixed to the other opening end portion 5b of the casing 5 through a second sealing portion 9.

The first sealing portion 8 is formed of a resin. Examples of the resin used for the first sealing portion 8 include epoxy resins, urethane resins, UV curable resins, and polyolefin resins such as polyethylene and polypropylene. In a cross section passing through one membrane bundle end portion 3e of the hollow fiber membrane bundle 3 and orthogonal to the axial direction L, the first sealing portion 8 fills the entire region except for the hollow portion 3b. Specifically, the first sealing portion 8 fills the spaces between the hollow fiber membranes 2, the inner spaces of the plurality of hollow fiber membranes 2, and the space between the hollow fiber membrane bundle 3 and the inner wall of the casing 5 (see FIG. 3A). The plurality of hollow fiber membranes 2 are exposed at an end surface 8b of the first sealing portion 8 that is on the side opposite to the second sealing portion 9. A communication port 8a that serves as an opening of the hollow portion 3b and allows communication between the hollow portion 3b and the liquid supply port 6a is formed in the first sealing portion 8. Therefore, the ink supplied from the liquid supply port 6a to the inner space of the first lid portion 6 is supplied to the casing 5 only from the communication port 8a. Specifically, the ink supplied from the liquid supply port 6a to the housing 4 is supplied to the hollow portion 3b of the hollow fiber membrane bundle 3 only from the communication port 8a and then supplied from the hollow portion 3b to the spaces between the plurality of hollow fiber membranes 2.

The second sealing portion 9 is formed of the same resin as that for the first sealing portion 8. In a cross section passing through the other membrane bundle end portion 3f of the hollow fiber membrane bundle 3 and orthogonal to the axial direction L, the second sealing portion 9 fills the entire region except for the inner spaces of the plurality of hollow fiber membranes 2. Specifically, the second sealing portion 9 does not fill the inner spaces of the plurality of hollow fiber membranes 2 but fills the spaces between the plurality of hollow fiber membranes 2, the space between the hollow fiber membrane bundle 3 and the inner wall of the casing 5, and the hollow portion 3b (see FIG. 3B). The plurality of hollow fiber membranes 2 are exposed at an end surface 9b of the second sealing portion 9 that is on the side opposite to the first sealing portion 8. Communication holes 9a that serve as openings of the inner spaces of the plurality of hollow fiber membranes 2 and allow communication between the suction port 7a and the inner spaces of the plurality of hollow fiber membranes 2 are formed in the second sealing portion 9. Therefore, the ink supplied from the communication port 8a to the hollow portion 3b does not flow to the second lid portion 7 side through the second sealing portion 9 but passes through the spaces between the plurality of hollow fiber membranes 2 and is discharged from the liquid discharge port 5d. Since the inner spaces of the plurality of hollow fiber membranes 2 are in communication with the suction port 7a, the inner spaces of the plurality of hollow fiber membranes 2 are reduced in pressure by sucking air through the suction port 7a using the suction pump 106.

The first sealing portion 8 fixes one membrane bundle end portion 3e of the hollow fiber membrane bundle 3 to the casing 5 such that, for example, a center axis L2 of one membrane bundle end portion 3e of the hollow fiber membrane bundle 3 and the center axis L1 of the casing 5 are coaxial with each other. The second sealing portion 9 fixes the other membrane bundle end portion 3f of the hollow fiber membrane bundle 3 to the casing 5 such that, for example, a center axis L3 of the other membrane bundle end portion 3f of the hollow fiber membrane bundle 3 and the center axis L1 of the casing 5 are coaxial with each other. Alternatively, the second sealing portion 9 may fix the other membrane bundle end portion 3f of the hollow fiber membrane bundle 3 to the casing 5 such that, for example, the center axis L3 of the other membrane bundle end portion 3f of the hollow fiber membrane bundle 3 is offset from the center axis L1 of the casing 5 toward the side opposite to the discharge port 5d. Alternatively, the second sealing portion 9 may fix the other membrane bundle end portion 3f of the hollow fiber membrane bundle 3 to the casing 5 such that, for example, the hollow fiber membrane bundle 3 is inclined with respect to the center axis L1 of the casing 5 so as to be spaced apart from the liquid discharge port 5d.

The ratio of the inner diameter of the casing 5 to the length of the hollow fiber membrane bundle 3 in the axial direction L may be, for example, 1:1 to 1:6.

The inner support 10 is a member for supporting the plurality of hollow fiber membranes 2 (the hollow fiber membrane bundle 3) from the radially inner side of the hollow fiber membrane bundle 3. The inner support 10 is formed into a cylindrical shape (pipe shape). The outer diameter of the inner support 10 is approximately the same as the inner diameter of the hollow fiber membrane bundle 3. The thickness of the inner support 10 may be appropriately set so long as, for example, the swollen hollow fiber membranes 2 can be supported. The thickness of the inner support 10 may be, for example, from 0.5 mm to 5 mm inclusive. A plurality of openings 11 are formed in the inner support 10. The inner support 10 is formed into, for example, a mesh form. When the inner support 10 is formed into a mesh form, the meshes correspond to the plurality of openings 11.

One support end portion 10c, which is one end portion of the inner support 10 in the axial direction L, is fixed to the casing 5 (the housing 4) through the first sealing portion 8, and the other support end portion 10d, which is the other end portion of the inner support 10 in the axial direction L, is fixed to the casing 5 (the housing 4) through the second sealing portion 9. The first sealing portion 8 and the second sealing portion 9 also fill the space between the hollow fiber membrane bundle 3 and the inner support 10 and some of the openings 11 of the inner support 10.

The inner support 10 is disposed between the end surface 8b of the first sealing portion 8 and the end surface 9b of the second sealing portion 9. Specifically, the inner support 10 does not protrude from the end surface 8b of the first sealing portion 8 and from the end surface 9b of the second sealing portion 9. The inner support 10 may have the same length as the hollow fiber membrane bundle 3 in the axial direction L or may be shorter than the hollow fiber membrane bundle 3. Among both ends of the inner support 10 in the axial direction L, the end on the first sealing portion 8 side is defined as an end 10a, and the end on the second sealing portion 9 side is defined as an end 10b. In this case, the end 10a of the inner support 10 may be exposed at the end surface 8b of the first sealing portion 8, and the end 10b may be embedded in the second sealing portion 9. Alternatively, the end 10a of the inner support 10 may be embedded in the first sealing portion 8, and the end 10b may be exposed at the end surface 9b of the second sealing portion 9. Alternatively, the end 10a of the inner support 10 may be embedded in the first sealing portion 8, and the end 10b may be embedded in the second sealing portion 9. In the example shown in FIGS. 2 and 3, the inner support 10 is shorter than the hollow fiber membrane bundle 3 in the axial direction L. In this case, the end 10a of the inner support 10 is exposed at the end surface 8b of the first sealing portion 8, and the end 10b of the inner support 10 is embedded in the second sealing portion 9.

Figure 5:
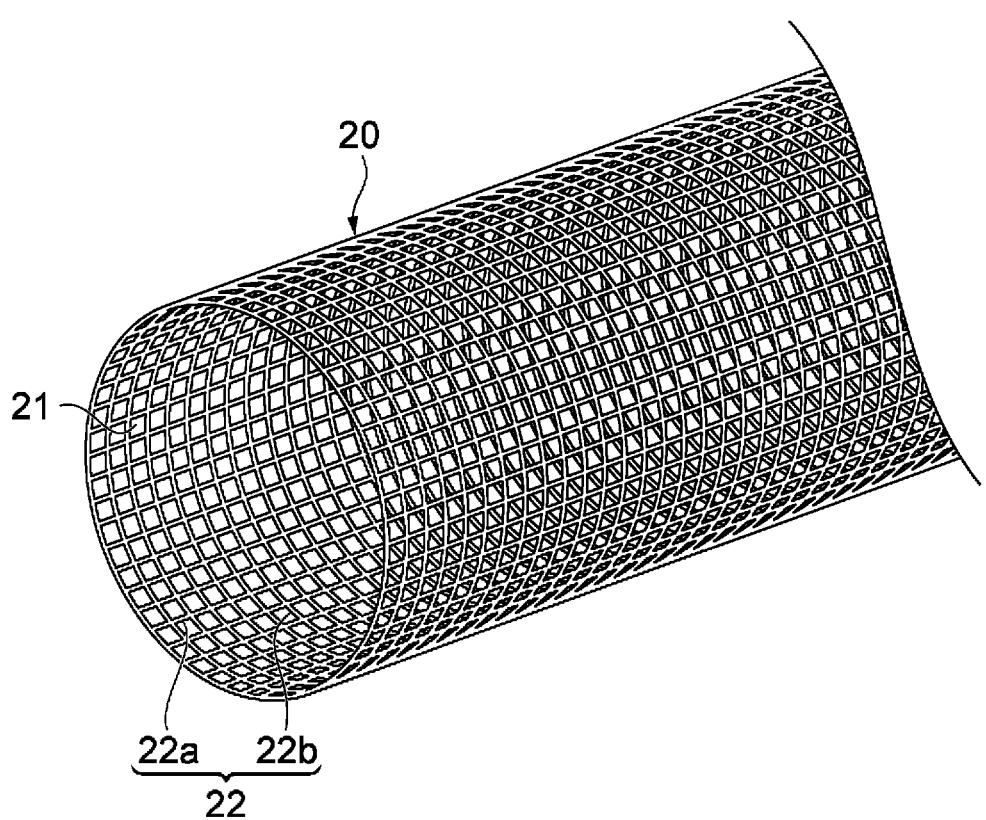
FIG. 5 A perspective view of an example of an outer support.
Figure 6:
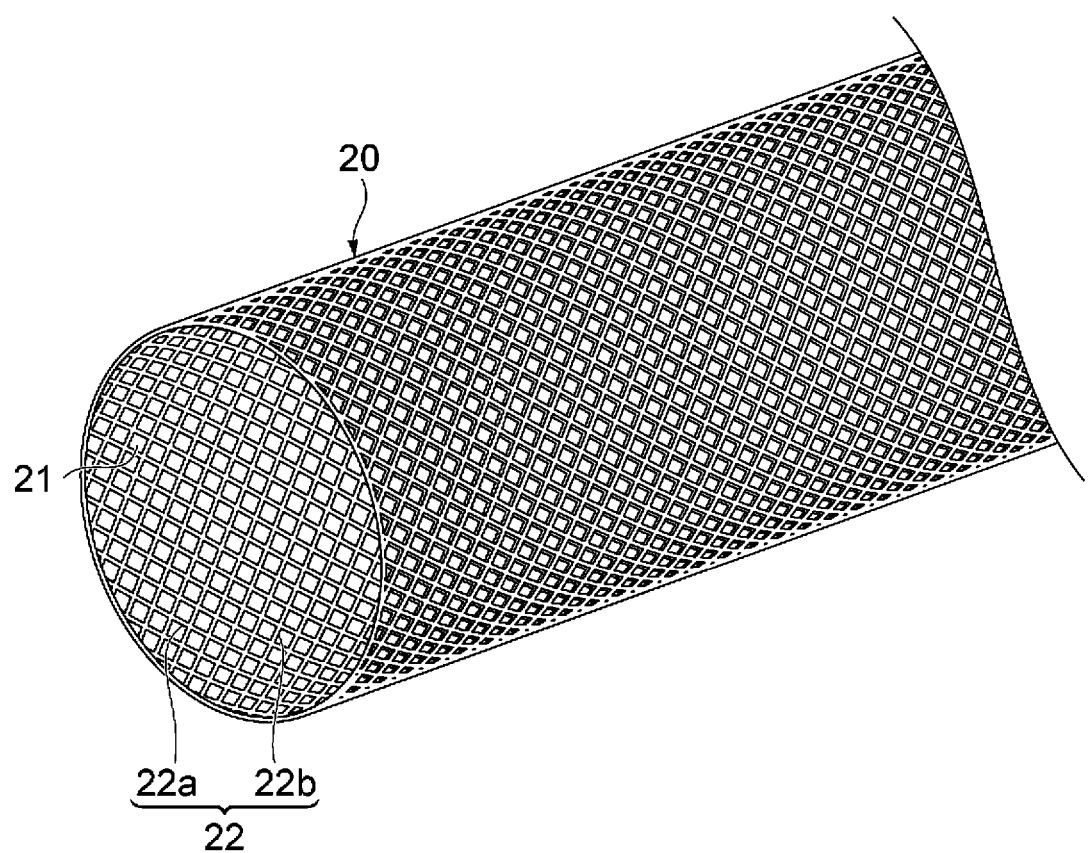
FIG. 6 A perspective view of an example of the outer support.

FIGS. 5 and 6 are perspective views of examples of the outer support. As shown in FIGS. 2 to 6, the outer support 20 is a member for supporting the swollen hollow fiber membranes 2 (the hollow fiber membrane bundle 3) from the radially outer side of the hollow fiber membrane bundle 3. The outer support 20 is formed into a cylindrical shape (pipe shape). The outer diameter of the outer support 20 is equal to or larger than the outer diameter of the hollow fiber membrane bundle 3 and equal to or smaller than the inner diameter of the casing 5. The outer support 20 may abut against an outer circumferential surface 3g of the hollow fiber member bundle 3, may abut against an inner circumferential surface 5g of the casing 5, or may be spaced apart from the outer circumferential surface 3g of the hollow fiber member bundle 3 and from the inner circumferential surface 5g of the casing 5. In the example shown in the figures, the outer support 20 is spaced apart from the outer circumferential surface 3g of the hollow fiber membrane bundle 3 and from the inner circumferential surface 5g of the casing 5. The thickness of the outer support 20 may be appropriately set so long as, for example, the swollen hollow fiber membranes 2 can be supported. The thickness of the outer support 20 may be, for example, from 0.5 mm to 5 mm inclusive.

A plurality of openings 21 are formed in the outer support 20. The outer support 20 is formed, for example, into a mesh form. When the outer support 20 is formed into a mesh form, the meshes correspond to the plurality of openings 21. The mesh form is a shape in which a plurality of linear portions 22 extending in different directions are connected such that the plurality of linear portions 22 form the plurality of openings 21. Examples of the shape of the openings 21 include square shapes, rectangular shapes, pentagonal shapes, hexagonal shapes, circular shapes, and elliptical shapes. The aperture ratio of the outer support 20 may be, for example, in the range of 10% or more, preferably in the range of from 20% to 80% inclusive, and still more preferably in the range of from 30% to 60% inclusive. The aperture ratio of the outer support 20 is the ratio of the total opening area of the openings 21 to the projected area of the outer support 20 including all the openings 21 when the outer support 20 is cut and flattened into a flat sheet shape. When both the inner support 10 and the outer support 20 are formed into mesh forms, the mesh form of the inner support 10 and the mesh form of the outer support 20 may be the same or different.

The outer support 20 shown in FIG. 5 includes: a plurality of first linear portions 22a extending in a direction parallel to the axial direction of the outer support 20 and arranged in a circular pattern; and a plurality of second linear portions 22b extending in a circular shape about the axial line of the outer support 20 and connected to the first linear portions 22a. The openings 21 of the outer support 20 shown in FIG. 5 have a square shape. The outer support 20 shown in FIG. 6 includes: a plurality of first linear portions 22a extending in a direction inclined at a prescribed angle with respect to the axial direction of the outer support 20; and a plurality of second linear portions 22b extending in a direction inclined opposite to the inclination direction of the first linear portions 22a at the prescribed angle with respect to the axial direction of the outer support 20 and connected to the first linear portions 22a. The openings 21 of the outer support 20 shown in FIG. 6 have a rhombic shape.

The linear portions 22 may have, for example, a polygonal cross-sectional shape, a circular cross-sectional shape, etc. The line diameter of the linear portions 22 may be appropriately set so long as, for example, the swollen hollow fiber membranes 2 can be supported. From the viewpoint of ease of production, it is preferable that the outer support 20 is formed of, for example, a resin. Examples of the resin used for the outer support 20 include polypropylenes and polyethylenes, and preferred examples include ultra-high molecular weight polyethylenes and high-density polyethylenes.

Figure 7:
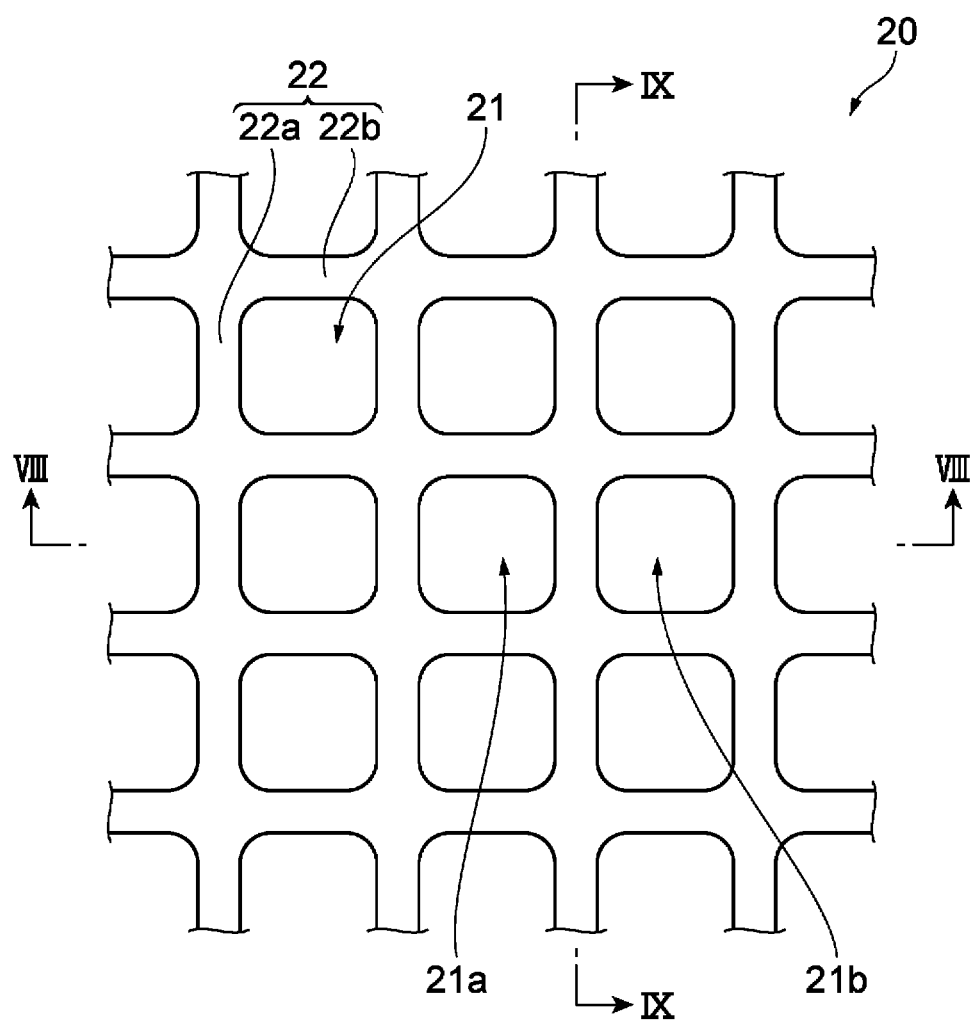
FIG. 7 A partial enlarged view of an example of the outer support.
Figure 8:
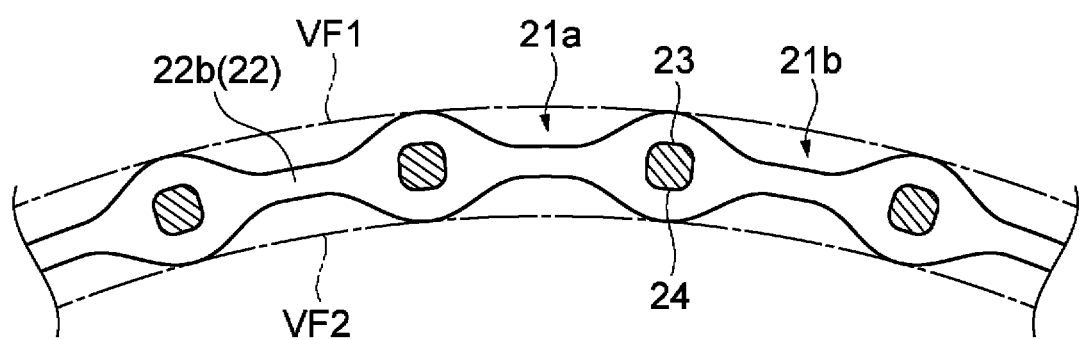
FIG. 8 A cross-sectional view along line VIII-VIII shown in FIG. 7.
Figure 9:
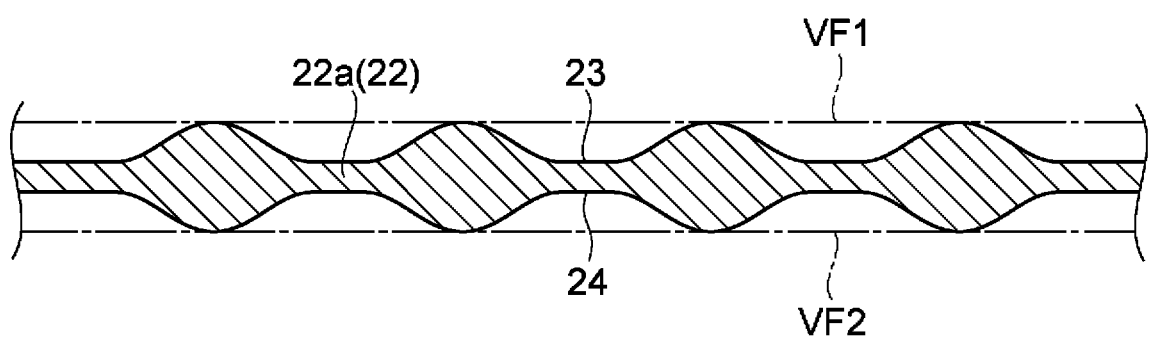
FIG. 9 A cross-sectional view along line IX-IX shown in FIG. 7.

FIG. 7 is a partial enlarged view of an example of the outer support. FIG. 8 is a cross-sectional view along line VIII-VIII in FIG. 7. FIG. 9 is a cross-sectional view along line IX-IX in FIG. 7. As shown in FIGS. 7 to 9, one of the plurality of openings 21 of the outer support 20 is defined as a first opening 21a, and an opening 21 adjacent to the first opening 21a is defined as a second opening 21b. A virtual circumferential surface circumscribing the outer support 20 is defined as a circumscribed circumferential surface VF1, and a virtual circumferential surface inscribed in the outer support 20 is defined as an inscribed circumferential surface VF2.

In this case, the outer support 20 has an outer communication portion 23 formed between the outer support 20 and the circumscribed circumferential surface VF1 to allow communication between the first opening 21a and the second opening 21b. The outer communication portion 23 is a recessed portion of the outer support 20 that is recessed from the circumscribed circumferential surface VF1. One outer communication portion 23 may be formed between each adjacent pair of openings 21 or may be formed between only some adjacent pairs of openings 21.

The outer support 20 has an inner communication portion 24 formed between the outer support 20 and the inscribed circumferential surface VF2 to allow communication between the first opening 21a and the second opening 21b. The inner communication portion 24 is a recessed portion of the outer support 20 that is recessed from the inscribed circumferential surface VF2. One inner communication portion 24 may be formed between each adjacent pair of openings 21 or may be formed between only some adjacent pairs of openings 21.

As shown in FIGS. 2 and 3, one support end portion 20c, which is one end portion of the outer support 20 in the axial direction L, is fixed to the casing 5 (the housing 4) through the first sealing portion 8, and the other support end portion 20d, which is the other end portion of the outer support 20 in the axial direction L, is fixed to the casing 5 (the housing 4) through the second sealing portion 9. The first sealing portion 8 and the second sealing portion 9 fill also the space between the hollow fiber membrane bundle 3 and the outer support 20 and some of the openings 21 of the outer support 20.

The outer support 20 is disposed between the end surface 8b of the first sealing portion 8 and the end surface 9b of the second sealing portion 9. Specifically, the outer support 20 does not protrude from the end surface 8b of the first sealing portion 8 and from the end surface 9b of the second sealing portion 9. The outer support 20 may have the same length as the hollow fiber membrane bundle 3 in the axial direction L or may be shorter than the hollow fiber membrane bundle 3. Among both ends of the outer support 20 in the axial direction L, the end on the first sealing portion 8 side is defined as an end 20a, and the end on the second sealing portion 9 side is defined as an end 20b. In this case, the end 20a of the outer support 20 may be exposed at the end surface 8b of the first sealing portion 8, and the end 20b may be embedded in the second sealing portion 9. Alternatively, the end 20a of the outer support 20 may be embedded in the first sealing portion 8, and the end 20b may be exposed at the end surface 9b of the second sealing portion 9. Alternatively, the end 20a of the outer support 20 may be embedded in the first sealing portion 8, and the end 20b may be embedded in the second sealing portion 9. In the example shown in FIGS. 2 and 3, the outer support 20 is shorter than the hollow fiber membrane bundle 3 in the axial direction L. In this case, the end 20a of the outer support 20 is exposed at the end surface 8b of the first sealing portion 8, and the end 20b of the outer support 20 is embedded in the second sealing portion 9.

Next a method for degassing an ink using the hollow fiber degassing module 1 will be described.

The ink is supplied from the ink storage unit 102 to the first ink supply pipe 104. Then the ink is supplied from the liquid supply port 6a to the inner space of the first lid portion 6. The ink supplied to the inner space of the first lid portion 6 passes through the communication port 8a and is supplied to the hollow portion 3b. The ink supplied to the hollow portion 3b passes through the plurality of openings 11 of the inner support 10, is supplied to the spaces between the plurality of hollow fiber membranes 2, passes through these spaces, and flows toward the radially outer side of the casing 5 (the hollow fiber membrane bundle 3). Specifically, the ink supplied to the hollow portion 3b is supplied to the outer side of each of the plurality of hollow fiber membranes 2 within the casing 5. In this case, the housing 4 is evacuated through the suction port 7a using the suction pump 106, and the inner spaces of the plurality of hollow fiber membranes 2 are thereby reduced in pressure. Then, when the ink passes through the spaces between the plurality of hollow fiber membranes 2, gasses dissolved in the ink and bubbles therein are drawn into the inner spaces of the plurality of hollow fiber membranes 2. The ink is thereby degassed. Then the degassed ink passes through the plurality of openings 21 of the outer support 20, is supplied to the gap between the hollow fiber membrane bundle 3 and the inner circumferential surface 5g of the casing 5, passes through the gap, and is discharged from the liquid discharge port 5d to the second ink supply pipe 105. The ink discharged to the second ink supply pipe 105 passes through the second ink supply pipe 105 and is supplied to the inkjet head 103.

In this case, the plurality of hollow fiber membranes 2 gradually swell with the ink over time. The rate and degree of swelling of the hollow fiber membranes 2 vary depending on the material of the hollow fiber membranes 2, the shape of the membranes, the form of the membranes, etc. and also vary depending on the type of ink. For example, when a polyolefin-based resin such as poly-4 methylpentene-1 is used as the material of the hollow fiber membranes 2 and the ink used is a ceramic ink containing a ceramic powder dispersed in a solvent such as a hydrocarbon solvent, the rate of swelling of the hollow fiber membranes 2 and the degree of swelling are particularly large. As the plurality of hollow fiber membranes 2 swell, they bulge while distorted toward the radially inner and outer sides of the hollow fiber membrane bundle 3. Specifically, the swollen hollow fiber membranes 2 expand toward the radially inner side of the hollow fiber membrane bundle 3 and try to enter the hollow portion 3b. Moreover, the swollen hollow fiber membranes 2 expand toward the radially outer side of the hollow fiber membrane bundle 3, are pressed against the inner circumferential surface 5g of the casing 5, and try to enter the liquid discharge port 5d.

No particular limitation is imposed on the solvent used for the ceramic ink so long as the effects of the present invention are not impaired, and any known solvent may be used. Specific examples of the solvent include: glycols such as ethylene glycol, diethylene glycol, and triethylene glycol; glycol monoalkyl ethers such as 3-methoxy-3-methylbutanol and 3-methoxybutanol; glycol dialkyl ethers such as diethylene glycol diethyl ether, diethylene glycol methyl ethyl ether, diethylene glycol methyl butyl ether, triethylene glycol methyl butyl ether, and tetraethylene glycol dimethyl ether; glycol monoacetates such as ethylene glycol monobutyl ether acetate, diethylene glycol monobutyl ether acetate, and propylene glycol monomethyl ether acetate; glycol diacetates; alcohols such as ethanol, n-propanol, isopropanol, n-butanol, 2-butanol, and 2-methyl-1-propanol; ketones such as acetone, methyl ethyl ketone, methyl-n-propyl ketone, methyl isopropyl ketone, methyl-n-butyl ketone, methyl isobutyl ketone, methyl-n-amyl ketone, methyl isoamyl ketone, diethyl ketone, ethyl-n-propyl ketone, ethyl isopropyl ketone, ethyl-n-butyl ketone, ethyl isobutyl ketone, di-n-propyl ketone, diisobutyl ketone, cyclohexanone, methylcyclohexanone, and isophorone; acetates such as methyl acetate, ethyl acetate, n-propyl acetate, isopropyl acetate, n-butyl acetate, isobutyl acetate, hexyl acetate, octyl acetate, 2-methylpropyl acetate, and 3-methylbutyl acetate; lactates such as methyl lactate, ethyl lactate, and butyl lactate; saturated hydrocarbons such as n-hexane, isohexane, n-nonane, isononane, dodecane, and isododecane; unsaturated hydrocarbons such as 1-hexene, 1-heptene, and 1-octene; cyclic saturated hydrocarbons such as cyclohexane, cycloheptane, cyclooctane, cyclodecane, and decalin; cyclic unsaturated hydrocarbons such as cyclohexene, cycloheptene, cyclooctene, 1,1,3,5,7-cyclooctatetraene, and cyclododecene; aromatic hydrocarbons such as benzene, toluene, and xylene; terpenes; ethers; cyclic imides; 3-alkyl-2-oxazolidinones such as 3-methyl-2-oxazolidinone and 3-ethyl-2-oxazolidinone; N-alkyl pyrrolidones such as N-methyl-2-pyrrolidone and N-ethyl-2-pyrrolidone; lactones such as γ-butyrolactone and ε-caprolactone; and nitrogen-containing solvents such as β-alkoxypropionamides.

Figure 11:
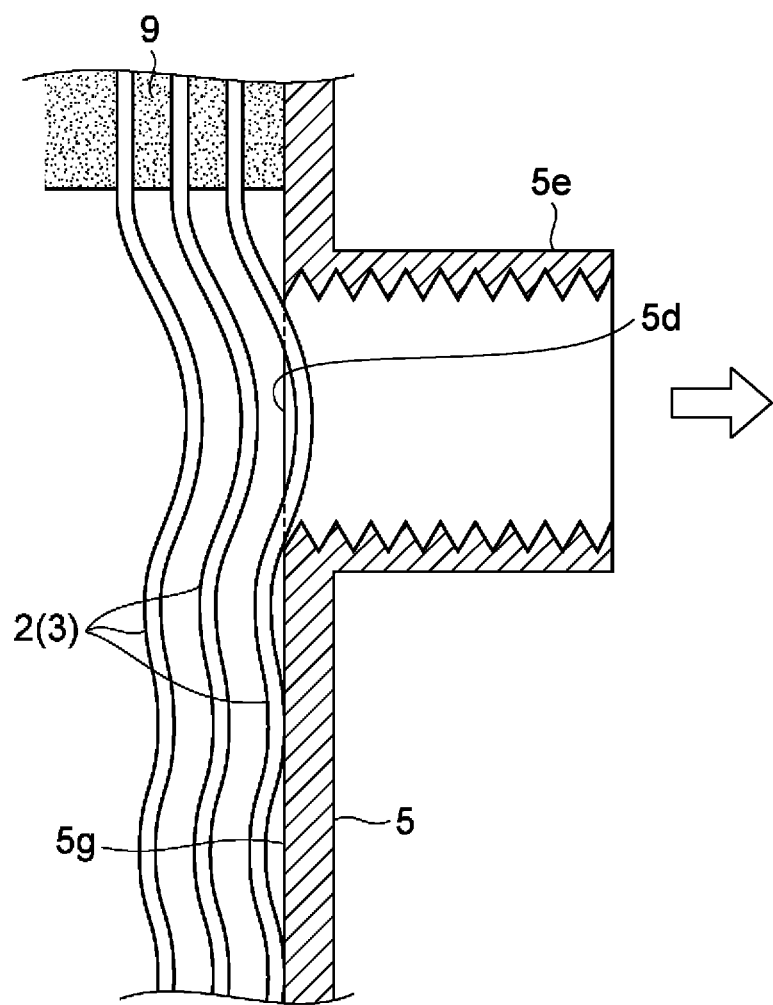
FIG. 11 A schematic illustration showing the state of hollow fiber membranes in a Comparative Example.

As shown in FIG. 11, in a hollow degassing module in a Comparative Example that does not include the inner support and the outer support, swollen hollow fiber membranes 2 come into pressure contact with the inner circumferential surface 5g of the casing 5. In this case, the swollen hollow fiber membranes 2 enter the liquid discharge port 5d, and the liquid discharge port 5d is clogged with the swollen hollow fiber membranes 2. Moreover, the gap between the hollow fiber membrane bundle 3 and the casing 5 is closed. Therefore, the ink channel is narrowed or closed, and the pressure drop of the ink increases abruptly.

Figure 10:
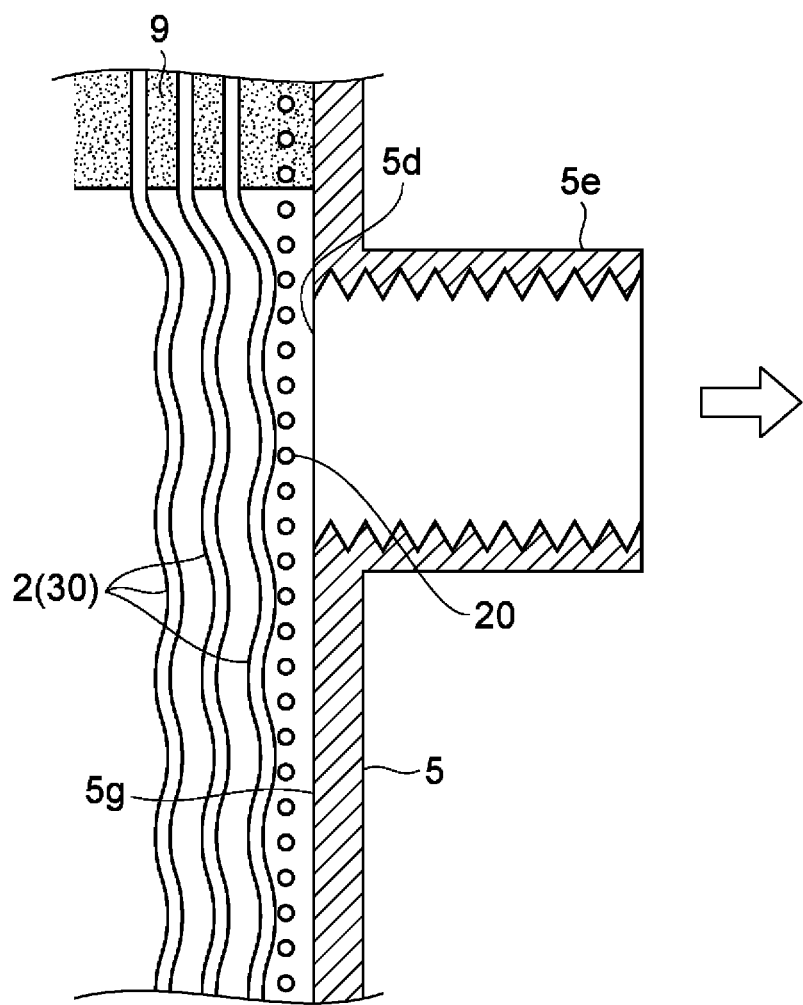
FIG. 10 A schematic illustration showing the state of hollow fiber membranes in the embodiment.

However, as shown in FIG. 10, in the hollow fiber degassing module in the present embodiment, since the outer support 20 is disposed between the hollow fiber membrane bundle 3 and the casing 5, the swollen hollow fiber membranes 2 are unlikely to come into pressure contact with the inner circumferential surface 5g of the casing 5. Therefore, the swollen hollow fiber membranes 2 are prevented from entering the liquid discharge port 5d, and the liquid discharge port 5d is prevented from being clogged. Moreover, the gap between the hollow fiber membrane bundle 3 and the casing 5 is prevented from being closed. Since the ink channel is prevented from being narrowed or clogged, an abrupt increase in the pressure drop of the ink can be prevented.

Since the inner support 10 is in contact with the inner circumferential surface 3a of the hollow fiber membrane bundle 3 that defines the hollow portion 3b, the swollen hollow fiber membranes 2 are prevented from entering the hollow portion 3b. Therefore, in the hollow fiber degassing module 1, even when the plurality of hollow fiber membranes 2 swell, the ink channel is prevented from being narrowed or clogged, so that an abrupt increase in the pressure drop of the ink can be prevented.

As described above, since the hollow fiber degassing module 1 according to the present embodiment includes the outer support 20 disposed between the hollow fiber membrane bundle 3 and the casing 5, the swollen hollow fiber membranes 2 are supported by the outer support 20 from the radially outer side of the hollow fiber membrane bundle 3. Therefore, even when the plurality of hollow fiber membranes 2 swell with the ink, the plurality of hollow fiber membranes 2 are prevented from coming into pressure contact with the inner circumferential surface 5g of the casing 5. This can prevent an abrupt increase in the pressure drop in the hollow fiber degassing module 1 due to clogging of the liquid discharge port 5d of the casing 5 with the plurality of hollow fiber membranes 2. Moreover, an abrupt increase in the pressure drop in the hollow fiber degassing module 1 due to closing of the gap between the hollow fiber membrane bundle 3 and the casing 5 can be prevented. Therefore, degassing of the ink can be performed for a long time.

When the outer support 20 is cylindrical, the outer support 20 can appropriately support the swollen hollow fiber membranes 2 from the radially outer side of the hollow fiber membrane bundle 3.

When the outer support 20 has a mesh form, the swollen hollow fiber membranes 2 are supported from the radially outer side of the hollow fiber membrane bundle 3, and an increase in the pressure drop of the ink passing through the outer support 20 can be prevented. This can prevent an increase in the initial pressure of the hollow fiber degassing module 1.

When the first sealing portion 8 and the second sealing portion 9 fill the spaces as described above, the plurality of hollow fiber membranes 2 divide the inner region of the housing 4 into the first region including the spaces between the plurality of hollow fiber membranes 2 and the second region including the inner spaces of the plurality of hollow fiber membranes 2. In this case, the ink supplied from the liquid supply port 6a can be supplied from the hollow portion 3b of the hollow fiber membrane bundle 3 to the spaces between the plurality of hollow fiber membranes 2 and then discharged from the liquid discharge port 5d. Moreover, the inner spaces of the plurality of hollow fiber membranes 2 can be evacuated through the suction port 7a, and the ink supplied from the liquid supply port 6a can be prevented from being discharged to the suction port 7a.

When the outer support 20 is disposed between the end surface 8b of the first sealing portion 8 and the end surface 9b of the second sealing portion 9, the hollow fiber degassing module 1 can be easily produced, so that the production cost of the hollow fiber degassing module 1 can be reduced.

When the end 20b of the outer support 20 that is located on the second sealing portion 9 side is embedded in the second sealing portion 9, the interface between the outer support 20 and the second sealing portion 9 is not exposed at the end surface 9b of the second sealing portion 9. In this case, even when the ink enters the interface between the outer support 20 and the second sealing portion 9, the ink is prevented from leaking from the second sealing portion 9. Moreover, when the suction pump 106 is connected to the suction port 7a, breakage of the suction pump 106 due to the ink discharged from the suction port 7a can be prevented.

When the end 20a of the outer support 20 is exposed from the first sealing portion 8, the hollow fiber degassing module 1 can be easily produced, and the production cost of the hollow fiber degassing module 1 can be reduced.

When the plurality of hollow fiber membranes 2 are not swollen and the outer support 20 is spaced apart from the hollow fiber membrane bundle 3, the plurality of hollow fiber membranes 2 are allowed to swell, and the swollen hollow fiber membranes 2 are prevented from coming into pressure contact with the inner circumferential surface 5g of the casing 5. In this case, the swollen hollow fiber membranes 2 are prevented from breaking.

When the outer communication portions 23 are formed in the outer support 20, even if the outer support 20 is expanded due to, for example, the swollen hollow fiber membranes 2 to cause the outer support 20 to come into pressure contact with the inner circumferential surface 5g of the casing 5, the flow channel of the ink can remain between the outer support 20 and the inner circumferential surface 5g of the casing 5. Therefore, an abrupt increase in the pressure drop in the hollow fiber degassing module 1 can be prevented.

When the inner communication portions 24 are formed in the outer support 20, even if the outer support 20 is expanded due to, for example, the swollen hollow fiber membranes 2 to cause the outer support 20 to come into pressure contact with the inner circumferential surface 5g of the casing 5, the flow channel of the ink can remain between the outer support 20 and the plurality of hollow fiber membranes 2. Therefore, an abrupt increase in the pressure drop in the hollow fiber degassing module 1 can be prevented.

When the ink is as described above, the plurality of hollow fiber membranes 2 easily swell. However, since the outer support 20 is provided, an abrupt increase in the pressure drop in the hollow fiber degassing module 1 can be prevented.

The preferred embodiment of the present invention has been described. However, the present invention is not limited to the above embodiment. In the embodiment described above, the inner support is provided. However, the inner support may not be provided. Even when the inner support is not provided, an abrupt increase in the pressure drop in the hollow fiber degassing module due to the plurality of hollow fiber membranes coming into pressure contact with the inner circumferential surface of the housing can be prevented. In the embodiment described above, the outer support has a cylindrical shape. However, the outer support can have any shape so long as the swollen hollow fiber membranes can be supported from the radially outer side of the hollow fiber membrane bundle. In the embodiment described above, the ink is exemplified as the liquid to be degassed. However, the liquid to be degassed may be a liquid other than the ink. Specifically, the plurality of hollow fiber membranes can swell with a liquid other than the ink. Therefore, even when such a liquid is used, the same effects as those described in the above embodiment can be obtained. In the embodiment described above, some examples of the hollow fiber degassing module have been specifically described. However, the hollow fiber degassing module can have any structure so long as the liquid supply port and the liquid discharge port are in communication with the spaces between the plurality of hollow fiber membranes and the suction port is in communication with the inner spaces of the plurality of hollow fiber membranes so that the liquid supplied from the liquid supply port can be degassed by suction from the suction port and then discharged from the liquid discharge port. In the embodiment described above, the casing, the first lid portion, and the second lid portion included in the housing are separate members. However, they may be integrated together.

EXAMPLES

Examples of the present invention will next be described. However, the present invention is not limited to the following Examples.

A hollow fiber degassing module in Example 1 and a hollow fiber degassing module in Comparative Example 1 were produced. An ink was circulated using a test circuit shown in FIG. 12, and an increase in pressure drop was measured.

(Test Circuit)

Figure 12:
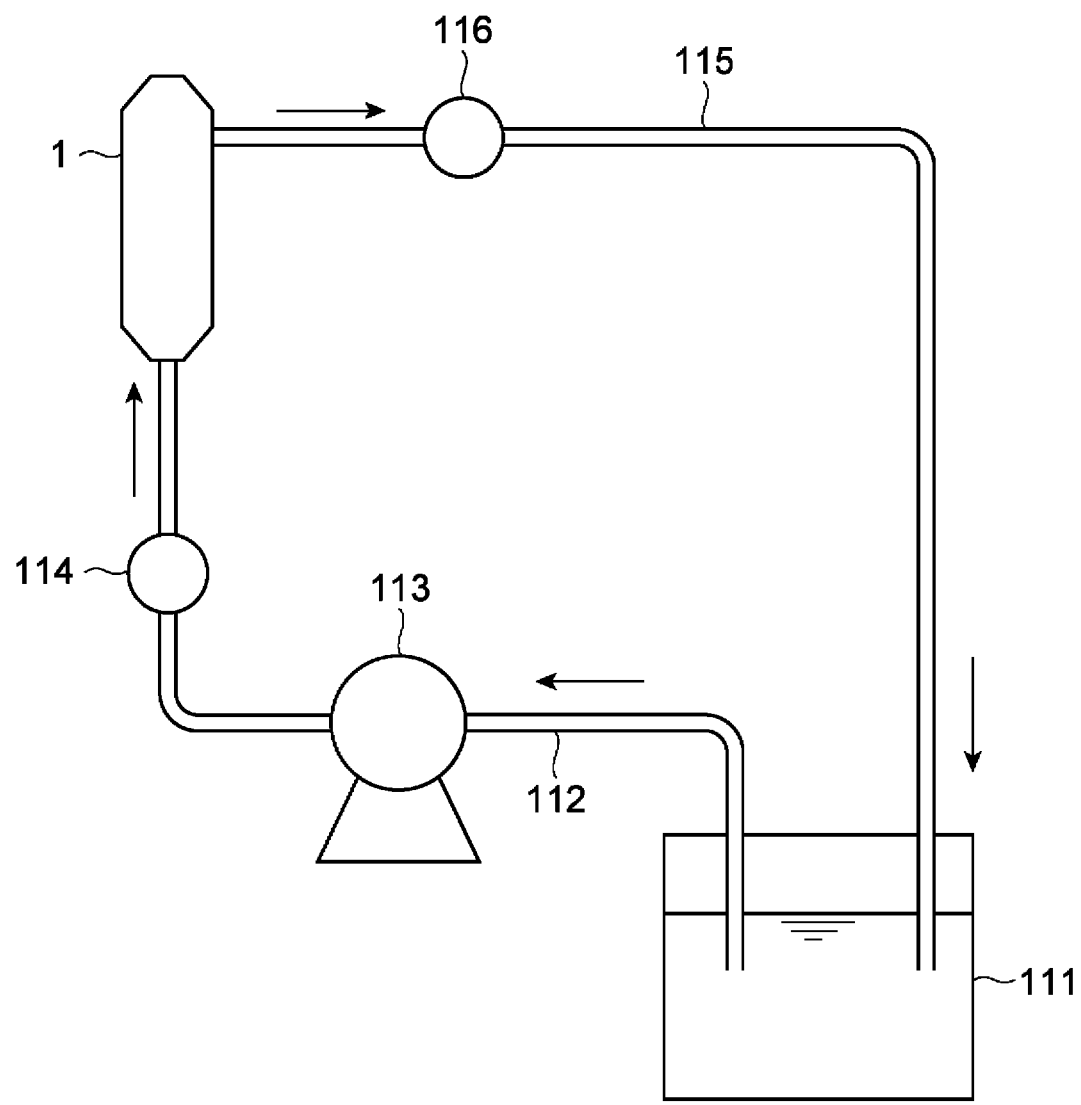
FIG. 12 A schematic diagram of a test circuit.

As shown in FIG. 12, in the test circuit, a first ink supply pipe 112 inserted into an ink tank 111 storing the ink was connected to the supply port of one of the hollow fiber degassing modules 1, and a pump 113 for sending the ink in the first ink supply pipe 112 to the hollow fiber degassing module 1 side and an inlet pressure gauge 114 for measuring the pressure of the ink in the first ink supply pipe 112 were attached to the first ink supply pipe 112. In the test circuit, a second ink supply pipe 115 inserted into the ink tank 111 was connected to the discharge port of the one of the hollow fiber degassing modules 1, and an outlet pressure gauge 116 for measuring the pressure of the ink in the second ink supply pipe 115 was attached to the second ink supply pipe 115.

Example 1

The hollow fiber degassing module in Example 1 was produced as follows.

In Example 1, a hollow fiber degassing module SEPAREL EF-G5-B15 manufactured by DIC Corporation was used as a base module. Then, in the base module, an inner support prepared by winding a Dai-pla Netlon sheet (size of meshes: 3 mm×3 mm, thickness: 1.4 mm) manufactured by Dainippon Plastics Co., Ltd. into a cylindrical shape with a pipe diameter ϕ of 14 mm was brought into contact with the inner circumferential surface of the hollow fiber membrane bundle. Moreover, in the base module, an outer support prepared by winding a Dai-pla Netlon sheet (size of meshes: 3 mm×3 mm, thickness: 1.4 mm) manufactured by Dainippon Plastics Co., Ltd. into a cylindrical shape with a pipe diameter φ of 39 mm was disposed between the hollow fiber membrane bundle and the housing so as to be separated from the hollow fiber membrane bundle and from the housing. The resulting base module was used as the hollow fiber membrane module in Example 1.

More specifically, hollow fiber membranes having an inner diameter of 100 μm and an outer diameter of 180 μm and having a side wall (membrane) made of poly-4 methylpentene-1 and having a heterogeneous structure were produced. Next, a large number of hollow fiber membranes bundled together were twisted into warp threads and woven into a bamboo blind form to thereby produce a hollow fiber membrane sheet having a prescribed length. Next, the hollow fiber membrane sheet was wound around the cylindrical inner support to thereby produce a cylindrical hollow fiber membrane bundle. Next, the hollow fiber membrane bundle and the cylindrical outer support were inserted into the casing of a housing. Then one membrane bundle end portion of the hollow fiber membrane bundle and the first end portion of the outer support were fixed to one opening end portion of the casing through the first sealing portion, and the other membrane bundle end portion of the hollow fiber membrane bundle and the second end portion of the outer support were fixed to the other opening end portion of the casing through the second sealing portion. Then the first lid portion was attached to one opening end portion of the casing, and the second lid portion was attached to the other opening end of the casing to thereby produce the hollow fiber degassing module in Example 1. The main specifications of the hollow fiber degassing module in Example 1 are shown in Table 1.

Comparative Example 1

The hollow fiber degassing module in Comparative Example 1 was produced using the same procedure as in Example 1 except that the outer support was not used and that the inner support was removed from the hollow fiber membrane bundle after the resin in the first sealing portion and the second sealing portion was cured. Specifically, a hollow fiber degassing module SEPAREL EF-G5-B15 manufactured by DIC Corporation was used as the hollow fiber degassing module in Comparative Example 1. The main specifications of the hollow fiber degassing module in Comparative Example 1 are shown in Table 1.

TABLE 1

| | Base module | Inner support | Outer support |
|---|---|---|---|
| Example 1 | SEPAREL EF-G5-B15 manufactured by DIC Corporation | Dai-pla Netlon sheet manufactured by Dainippon Plastics Co., Ltd. Size of meshes: 3 mm × 3 mm Thickness: 1.4 mm, Pipe diameter φ: 14 mm | Dai-pla Netlon sheet manufactured by Dainippon Plastics Co., Ltd. Size of meshes: 3 mm × 3 mm Thickness: 1.4 mm, Pipe diameter φ: 19 mm |
| Comparative Example 1 | SEPAREL EF-G5-B15 manufactured by DIC Corporation | None | None |

(Experiments)

In experiments, a ceramic ink containing a hydrocarbon solvent ("Exxsol (registered trademark) D130" manufactured by Exxon Mobil Corporation (Hydrocarbones, C14-C18, n-alkanes, iso-alkanes, cyclics, aromatics, etc.)) was used as the liquid to be degassed.

Figure 13:
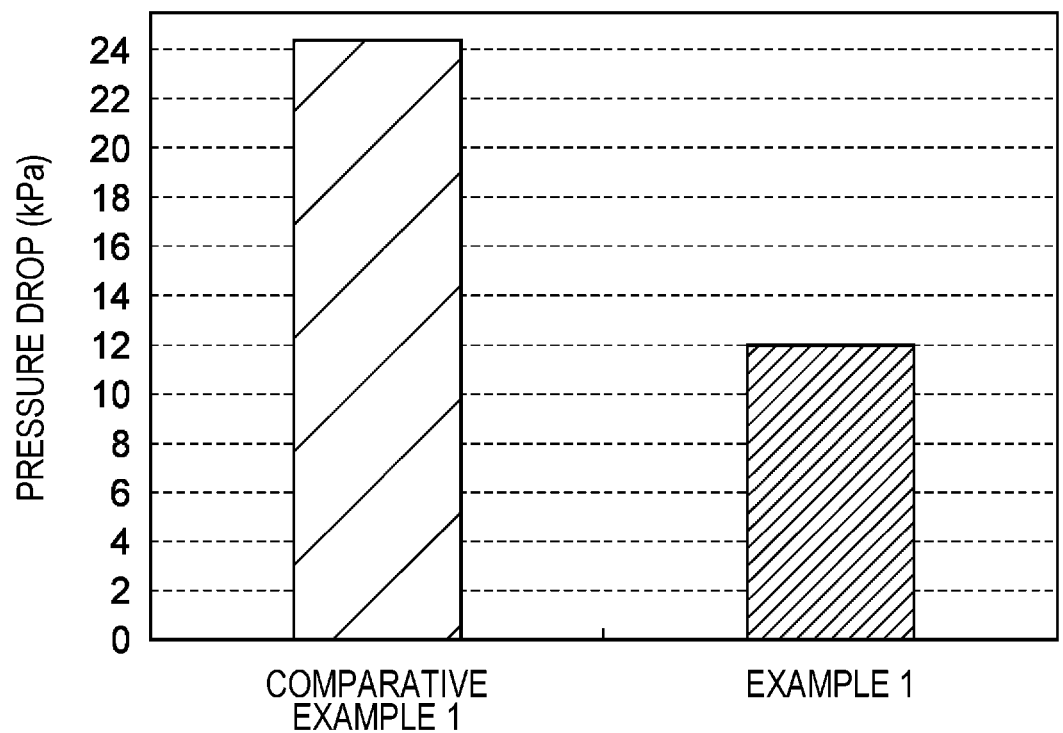
FIG. 13 A graph showing a pressure drop in Example 1 and a pressure drop in Comparative Example 1.

The temperature of the ink was set to 50° C., and the flow rate of the ink was set to 1200 g/min. Then the ink was circulated. The difference between the inlet pressure measured by the inlet pressure gauge 114 and the outlet pressure measured by the outlet pressure gauge 116 was computed as a pressure drop. The pressure drop in each of Example 1 and Comparative Example 1 after circulation of the ink for 30 minutes is shown in FIG. 13. The relation between the time elapsed and the pressure drop during circulation of the ink for 120 hours is shown in FIG. 14.

(Evaluation)

As shown in FIG. 13, in Comparative Example 1, the pressure drop exceeded 24 kPa after the ink was circulated for 30 minutes. However, in Example 1, the pressure drop was only about 12 kPa after the ink was circulated for 30 minutes. As can be seen from these results, when the inner support and the outer support are provided, an increase in pressure drop can be reduced.

Figure 14:
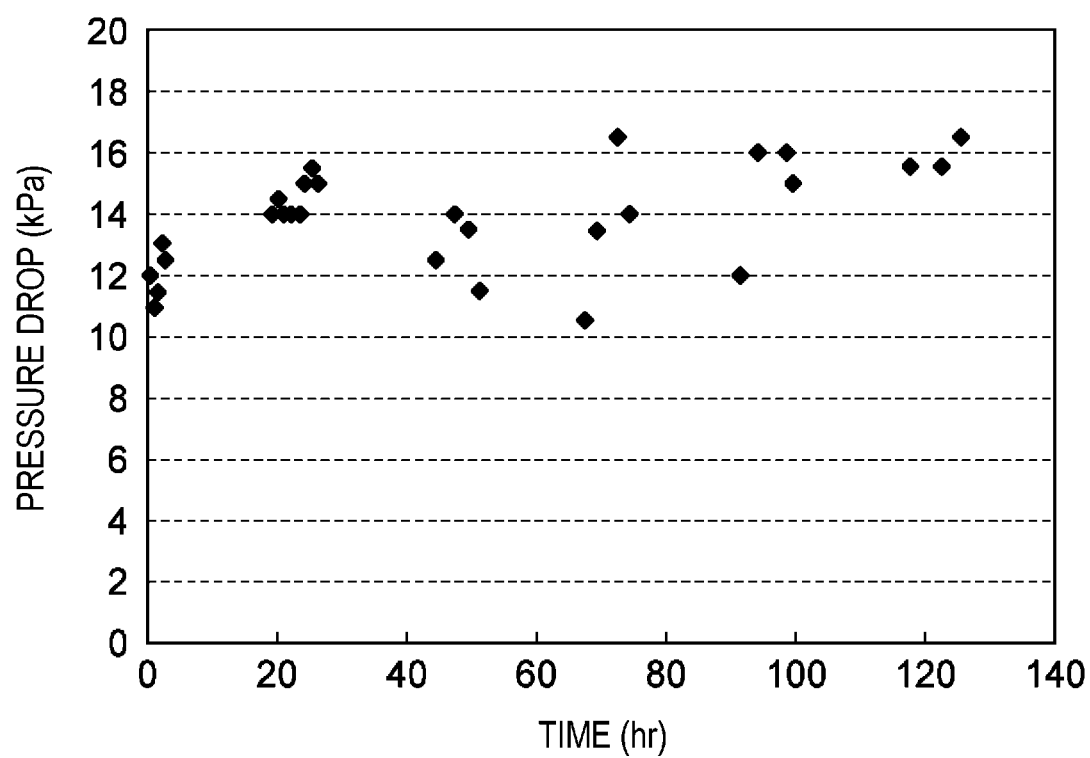
FIG. 14 A graph showing the relation between elapsed time and the pressure drop in Example 1.

As shown in FIG. 14, in Example 1, even after circulation of the ink for 120 hours, no abrupt increase in pressure drop was found. As can be seen from these results, when the inner support and the outer support are provided, an increase in pressure drop can be prevented.

In Comparative Example 1, a cross section orthogonal to the center axis and a cross section passing through the center axis after circulation of the ink for 30 minutes were observed. Moreover, in Example 1, a cross section orthogonal to the center axis and a cross section passing through the center axis after circulation of the ink for 30 minutes were observed. In Comparative Example 1, swollen hollow fiber membranes were in pressure contact with the inner circumferential surface of the casing after the ink was circulated for 30 minutes, and the swollen hollow fiber membranes entered the liquid discharge port, so that the liquid discharge port was clogged. However, in Example 1, even after circulation of the ink for one week, the outer support allowed the swollen hollow fiber membranes to be separated from the inner circumferential surface of the casing, and the swollen hollow fiber membranes did not enter the liquid discharge port. As can be seen from these results, when the outer support is provided, an abrupt increase in the pressure drop can be prevented. Moreover, as can be seen, when the thickness of the outer support is about 1.4 mm, the swollen hollow fiber membranes can be supported.

REFERENCE SIGNS LIST

1 hollow fiber degassing module, 2 hollow fiber membrane, 3 hollow fiber membrane bundle, 3a inner circumferential surface, 3b hollow portion, 3e one membrane bundle end portion, 3f the other membrane bundle end portion, 3g outer circumferential surface, 4 housing, 5 casing, 5a one opening end portion, 5b the other opening end portion, 5c side wall, 5d liquid discharge port, 5e connection portion, 5f female thread, 5g inner circumferential surface, 6 first lid portion, 6a liquid supply port, 6b connection portion, 6c female thread, 7 second lid portion, 7a suction port, 7b connection portion, 7c female thread, 8 first sealing portion, 8a communication port, 8b end surface, 9 second sealing portion, 9a communication hole, 9b end surface, 10 inner support, 10a end, 10b end, 10c one support end portion, 10d the other support end portion, 11 opening, 20 outer support, 20a end, 20b end, 20c one support end portion, 20d the other support end portion, 21 opening, 21a first opening, 21b second opening, 22 linear portion, 22a first linear portion, 22b second linear portion, 23 outer communication portion, 24 inner communication portion, 101 inkjet printer, 102 ink storage unit, 103 inkjet head, 104 first ink supply pipe (ink channel), 105 second ink supply pipe (ink channel), 106 suction pump, 107 suction pipe, 111 ink tank, 112 first ink supply pipe, 113 pump, 114 inlet pressure gauge, 115 second ink supply pipe, 116 outlet pressure gauge, L axial direction, VF1 circumscribed circumferential surface, VF2 inscribed circumferential surface.

The invention claimed is:

1. A hollow fiber degassing module comprising:
   a hollow fiber membrane bundle including a plurality of hollow fiber membranes bundled into a cylindrical shape;
   a housing that houses the hollow fiber membrane bundle, includes a liquid supply port and a liquid discharge port that are formed in communication with spaces between the plurality of hollow fiber membranes, and further includes a suction port formed in communication with inner spaces of the plurality of hollow fiber membranes;
   an outer support having a plurality of openings formed therein, supporting the plurality of hollow fiber membranes from a radially outer side of the hollow fiber membrane bundle, and disposed between the hollow fiber membrane bundle and the liquid discharge port;
   an inner support having a plurality of openings formed therein, supporting the plurality of hollow fiber membranes from a radially inner side of the hollow fiber membrane bundle, and disposed between the hollow fiber membrane bundle and the liquid supply port, and
   at least one of the plurality of openings of the outer support is formed at a position facing the liquid discharge port on the outer support,
   wherein the plurality of openings of the outer support include a first opening and a second opening adjacent to the first opening, and
   wherein the outer support has an outer communication portion that is formed between the outer support and a circumscribed circumferential surface of the outer support and allows communication between the first opening and the second opening.

2. The hollow fiber degassing module according to claim 1, wherein the outer support has a cylindrical shape.

3. The hollow fiber degassing module according to claim 1, wherein the outer support has a mesh form.

4. The hollow fiber degassing module according to claim 1, further comprising:
   a first sealing portion that fixes one membrane bundle end portion of the hollow fiber membrane bundle and one support end portion of the outer support to the housing; and
   a second sealing portion that fixes the other membrane bundle end portion of the hollow fiber membrane bundle and the other support end portion of the outer support to the housing,
   wherein, in a cross section passing through one membrane bundle end portion and orthogonal to an axial direction of the housing, the first sealing portion fills an entire region in the housing except for a hollow portion of the hollow fiber membrane bundle, and
   wherein, in a cross section passing through the other membrane bundle end portion and orthogonal to the axial direction of the housing, the second sealing portion fills an entire region in the housing except for the inner spaces of the plurality of hollow fiber membranes.

5. The hollow fiber degassing module according to claim 4, wherein the outer support is disposed between an end surface of the first sealing portion that is on a side opposite to the second sealing portion and an end surface of the second sealing portion that is on a side opposite to the first sealing portion.

6. The hollow fiber degassing module according to claim 4, wherein an end portion of the outer support that is on a second sealing portion side is embedded in the second sealing portion.

7. The hollow fiber degassing module according to claim 4, wherein an end portion of the outer support that is on a first sealing portion side is exposed from the first sealing portion.

8. The hollow fiber degassing module according to claim 1, wherein the outer support is spaced apart from the hollow fiber membrane bundle when the plurality of hollow fiber membranes are not swollen.

9. The hollow fiber degassing module according to claim 1,
   wherein the outer support has an inner communication portion that is formed between the outer support and an inscribed circumferential surface of the outer support and allows communication between the first opening and the second opening.

10. The hollow fiber degassing module according to claim 1, wherein the liquid contains a hydrocarbon solvent.

11. The hollow fiber degassing module according to claim 1, wherein the liquid is at least one selected from the group consisting of glycols, glycol monoalkyl ethers, glycol dialkyl ethers, glycol monoacetates, glycol diacetates, alcohols, ketones, acetates, lactates, saturated hydrocarbons, unsaturated hydrocarbons, cyclic saturated hydrocarbons, cyclic unsaturated hydrocarbons, aromatic hydrocarbons, terpenes, ethers, cyclic imides, 3-alkyl-2-oxazolidinones, N-alkyl pyrrolidones, lactone, and nitrogen-containing solvents.

12. The hollow fiber degassing module according to claim 1, wherein the liquid is an UV ink or a ceramic ink.

13. An inkjet printer in which an ink stored in an ink storage unit is supplied to an inkjet head through an ink channel, the inkjet printer comprising the hollow fiber degassing module according to claim 1, the hollow fiber degassing module being attached to the ink channel.

14. A method for degassing a liquid, the method using the hollow fiber degassing module according to claim 1, the method comprising: supplying the liquid to the liquid supply port to thereby supply the liquid to the spaces between the plurality of hollow fiber membranes; sucking air through the suction port to degas the liquid supplied to the spaces between the plurality of hollow fiber membranes; and discharging the liquid degassed in the spaces between the plurality of hollow fiber membranes from the liquid discharge port.

15. A hollow fiber degassing module comprising:
   a hollow fiber membrane bundle including a plurality of hollow fiber membranes bundled into a cylindrical shape;
   a housing that houses the hollow fiber membrane bundle, includes a liquid supply port and a liquid discharge port that are formed in communication with spaces between the plurality of hollow fiber membranes, and further includes a suction port formed in communication with inner spaces of the plurality of hollow fiber membranes;

an outer support having a plurality of openings formed therein, supporting the plurality of hollow fiber membranes from a radially outer side of the hollow fiber membrane bundle, and disposed between the hollow fiber membrane bundle and the liquid discharge port;

an inner support having a plurality of openings formed therein, supporting the plurality of hollow fiber membranes from a radially inner side of the hollow fiber membrane bundle, and disposed between the hollow fiber membrane bundle and the liquid supply port, and at least one of the plurality of openings of the outer support is formed at a position facing the liquid discharge port on the outer support, wherein the plurality of openings of the outer support include a first opening and a second opening adjacent to the first opening, and wherein the outer support has an inner communication portion that is formed between the outer support and an inscribed circumferential surface of the outer support and allows communication between the first opening and the second opening.

\* \* \* \* \*